US012750206B2

(12) United States Patent
Kim et al.

(10) Patent No.: US 12,750,206 B2
(45) Date of Patent: Sep. 29, 2026

(54) ENCRYPTION DEVICE AND OPERATING METHOD OF ENCRYPTION DEVICE

(71) Applicant: SAMSUNG ELECTRONICS CO., LTD., Suwon-si (KR)

(72) Inventors: Gapkyoung Kim, Suwon-si (KR); Jaehyeok Kim, Suwon-si (KR); Yongki Lee, Suwon-si (KR); Hongmook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 18/634,211

(22) Filed: Apr. 12, 2024

(65) Prior Publication Data

US 2024/0356726 A1 Oct. 24, 2024

(30) Foreign Application Priority Data

Apr. 21, 2023 (KR) ........................ 10-2023-0052904
Jun. 20, 2023 (KR) ........................ 10-2023-0078855

(51) Int. Cl.
*H04L 9/06* (2006.01)
*G06F 21/60* (2013.01)
*H04L 9/08* (2006.01)

(52) U.S. Cl.
CPC ............ *H04L 9/0631* (2013.01); *G06F 21/60* (2013.01); *G06F 21/602* (2013.01); *H04L 9/06* (2013.01); *H04L 9/08* (2013.01)

(58) Field of Classification Search
CPC ... H04L 9/06; H04L 9/08; H04L 9/003; H04L 9/0631; H04L 2209/122; G06F 21/60; G06F 21/602
See application file for complete search history.

(56) References Cited

U.S. PATENT DOCUMENTS 8,265,273 B2 9/2012 Yokota et al.
10,097,343 B2 10/2018 Takatsukasa
(Continued)

FOREIGN PATENT DOCUMENTS

JP 2008209499 A * 9/2008 ........... H04L 9/0631
KR 20180021473 A * 3/2018 ........... H04L 9/0631
(Continued)

OTHER PUBLICATIONS

"Hamming-code Based Fault Detection Design Methodology for Block Ciphers"—Potestad-Ordonez et al, 2020 IEEE International Symposium on Circuits and Systems, Oct. 21, 2020 Hamming-code Based Fault Detection Design Methodology for Block Ciphers (Year: 2020).*

(Continued)

*Primary Examiner* — Randy A Scott
(74) *Attorney, Agent, or Firm* — Morgan, Lewis & Bockius LLP

(57) ABSTRACT

An encryption device includes an encryption core circuit configured to generate output data by performing an encryption operation on input data, and an encryption controller circuit configured to control an operation of the encryption core. The encryption core circuit includes a shiftrow circuit configured to generate shift data by performing a shiftrow operation on the input data, a security circuit configured to generate permutation data by performing a permutation operation including a mixcolumn multiplication operation on the shift data, a mixcolumn addition circuit configured to generate first mid data by performing a mixcolumn addition operation on the permutation data, and a round key addition operation circuit configured to generate the output data by performing a round key addition operation on the first mid data.

18 Claims, 14 Drawing Sheets

(56) References Cited

U.S. PATENT DOCUMENTS

| | | | | |
|---|---|---|---|---|
| 10,153,896 | B2 | 12/2018 | Moon | |
| 10,171,231 | B2 | 1/2019 | Gueron et al. | |
| 11,101,824 | B2 | 8/2021 | Hong | |
| 11,121,856 | B2 * | 9/2021 | Satpathy | G06F 7/00 |
| 11,256,478 | B2 | 2/2022 | David | |
| 11,303,436 | B2 | 4/2022 | De Mulder | |
| 2005/0058285 | A1 * | 3/2005 | Stein | H04L 9/0631<br>380/37 |
| 2007/0140478 | A1 * | 6/2007 | Komano | H04L 9/0618<br>380/28 |
| 2024/0259182 | A1 * | 8/2024 | Ghosh | H04L 9/0631 |

FOREIGN PATENT DOCUMENTS

| | | |
|---|---|---|
| KR | 10-2020-0127880 A | 11/2020 |
| KR | 10-2413846 B1 | 6/2022 |

OTHER PUBLICATIONS

"Atomic-AES: A Compact Implementation of the AES Encryption/Decryption Core"—Banik et al., International Association for Cryptologic Research, Sep. 27, 2016 https://eprint.iacr.org/2016/927.pdf (Year: 2016).*

F.E. Potestad-Ordonez et al., "Hamming-Code based fault detection design methodology for block ciphers", 2020 IEEE International Symposium on Circuits and Systems (ISCAS).

Joan Daeman et al., "The Rijndael Block Cipher", IEEE Draft; PDFV5RHXENBDP, IEEE-SA, Piscataway, NJ USA, vol. 802.15, Mar. 12, 2009 (Mar. 12, 2009), pp. 1-45, XP017765071.

P.V. Sriniwas Shastry et al., "Rolled architecture based implementation of AES using T-Box" Circuits and Systems (MWSCAS), 2012 IEEE 55th International Midwest Symposium on, IEEE,Aug. 5, 2012, pp. 626-630, XP032231446, DOI: 10.1109/MWSCAS.2012.6292098 ISBN: 978-1-4673-2526-4.

M. Feldhofer et al., "AES implementation on a grain of sand Cryptographic algorithms and architectures for system-on-chip", Oct. 1, 2005, vol. 152, No. 1, Oct. 1, 2005, pp. 13-20, XP006025411.

EESR issued in corresponding EP Patent Application No. 24170357.8 on Sep. 19, 2024.

* cited by examiner

FIG. 8

| MULTIPLICATION VALUE | BINARY | ENCODER | ADDITIONAL OPERATION CIRCUIT | COMBINATION |
|---|---|---|---|---|
| {01} | 4'0001 | ○ | X | - |
| {02} | 4'0010 | ○ | X | - |
| {03} | 4'0011 | X | ○ | {01}⊕{02} |
| {0E} | 4'1110 | X | ○ | {0D}⊕{01}⊕{02} |
| {0B} | 4'1011 | X | ○ | {09}⊕{02} |
| {0D} | 4'1101 | ○ | X | - |
| {09} | 4'1001 | ○ | X | - |

FIG. 9

| MULTIPLICATION VALUE | BINARY | COMBINATION |
|---|---|---|
| {01} | 4'0001 | {02}⊕{03} |
| {02} | 4'0010 | – |
| {03} | 4'0011 | – |
| {09} | 4'1001 | {02}⊕{0B} |
| {0B} | 4'1011 | {02}⊕{09} |
| {0D} | 4'1101 | {03}⊕{0E} |
| {0E} | 4'1110 | {03}⊕{0D} |

FIG. 10

| MULTIPLICATION VALUE | BINARY | COMBINATION | |
|---|---|---|---|
| {01} | 4'0001 | {02}⊕{03} | |
| {02} | 4'0010 | {01}⊕{03} | |
| {03} | 4'0011 | {01}⊕{02} | |
| {08} | 4'1000 | – | |
| {09} | 4'1001 | {01}⊕{08} | {03}⊕{0A} |
| {0A} | 4'1010 | – | |
| {0B} | 4'1011 | {03}⊕{08} | {01}⊕{0A} |
| {0C} | 4'1100 | – | |
| {0D} | 4'1101 | {01}⊕{0C} | {02}⊕{0F} |
| {0E} | 4'1110 | {02}⊕{0C} | {01}⊕{0F} |
| {0F} | 4'1111 | – | |

FIG. 11

| MULTIPLICATION VALUE | BINARY | COMBINATION | | | |
|---|---|---|---|---|---|
| {01} | 4'0001 | {08}⊕{09} | {0A}⊕{0B} | {0C}⊕{0D} | {0E}⊕{0F} |
| {02} | 4'0010 | {09}⊕{0B} | - | - | - |
| {03} | 4'0011 | {0D}⊕{0E} | - | - | - |

ENCRYPTION DEVICE AND OPERATING METHOD OF ENCRYPTION DEVICE

CROSS-REFERENCE TO RELATED APPLICATION

This application claims priority under 35 U.S.C. § 119 to Korean Patent Application No. 10-2023-0052904, filed on Apr. 21, 2023, and Korean Patent Application No. 10-2023-0078855, filed on Jun. 20, 2023, in the Korean Intellectual Property Office, the disclosures of which are incorporated by reference herein in their entireties.

TECHNICAL FIELD

Embodiments of the inventive concept relate to an encryption device that performs an encryption operation.

DISCUSSION OF RELATED ART

Smart cards and integrated circuit (IC) cards use secure information on users. In order to prevent security information of a user from being leaked by hacking, an encryption device that converts security information transmitted through a signature or authentication procedure into cipher text and transmits the cipher text may be utilized.

An attacker may attempt a side-channel analysis attack instead of directly manipulating input or output data. During the side-channel analysis attack, an attacker may collect additional information, such as the amount of power consumed by an encryption circuit and waveforms of an electromagnetic wave generated by an encryption device. An attacker may attack an encryption device to discover the key used by the encryption device based on the collected information.

SUMMARY

Embodiments of the inventive concept provides an encryption device that has high resistance to power analysis and may perform data encryption more quickly, and an operating method of the encryption device.

According to an aspect of the inventive concept, an encryption device includes an encryption core circuit configured to generate output data by performing an encryption operation on input data, and an encryption controller circuit configured to control an operation of the encryption core. The encryption core includes a shiftrow circuit configured to generate shift data by performing a shiftrow operation on the input data, a security circuit configured to generate permutation data by performing a permutation operation including a mixcolumn multiplication operation on the shift data, a mixcolumn addition circuit configured to generate first mid data by performing a mixcolumn addition operation on the permutation data, and a round key addition operation circuit configured to generate the output data by performing a round key addition operation on the first mid data.

According to an aspect of the inventive concept, an encryption device includes an encryption core circuit configured to generate output data by performing a plurality of round operations on input data, and an encryption controller circuit configured to control the encryption core to sequentially perform a plurality of round operations including an initial round operation, an iterative round operation of a preset reference number of times, and a final round operation. The encryption core circuit includes a shiftrow circuit configured to generate shift data by performing a shiftrow operation on the input data, a security circuit configured to generate permutation data by performing a permutation operation including a mixcolumn multiplication operation on the shift data, a mixcolumn addition circuit configured to generate first mid data by performing a mixcolumn addition operation on the permutation data, and a round key addition operation circuit configured to generate the output data by performing a round key addition operation on the first mid data. The iterative round operation includes the shiftrow operation, the permutation operation, the mixcolumn addition operation, and the round key addition operation.

According to an aspect of the inventive concept, an operating method of an encryption device including an encryption core circuit configured to generate output data by performing an encryption operation on input data and an encryption controller circuit configured to control an operation of the encryption core, includes generating shift data by performing a shiftrow operation on the input data, generating permutation data by performing a permutation operation including a mixcolumn multiplication operation on the shift data, generating first mid data by performing a mixcolumn addition operation on the permutation data, and generating the output data by performing a round key addition operation on the first mid data.

BRIEF DESCRIPTION OF THE DRAWINGS

The above and other features of the inventive concept will become more apparent by describing in detail embodiments thereof with reference to the accompanying drawings, in which:

FIG. 8 is a table illustrating an example of a mixcolumn multiplication operation result that may be output through the plurality of encoders and the plurality of additional operation circuits in the sub security circuit of FIG. 7;

FIG. 9 is a table illustrating an example of a mixcolumn multiplication operation result that may be output through the plurality of encoders and the plurality of additional operation circuits in the sub security circuit of FIG. 7;

FIG. 10 is a table illustrating an example in which a mixcolumn multiplication operation result may be generated through a configuration of a sub security circuit, according to an embodiment;

FIG. 11 is a table illustrating an example in which a mixcolumn multiplication operation result may be generated through a configuration of a sub security circuit, according to an embodiment;

DETAILED DESCRIPTION OF AN EMBODIMENTS

Figure 1:
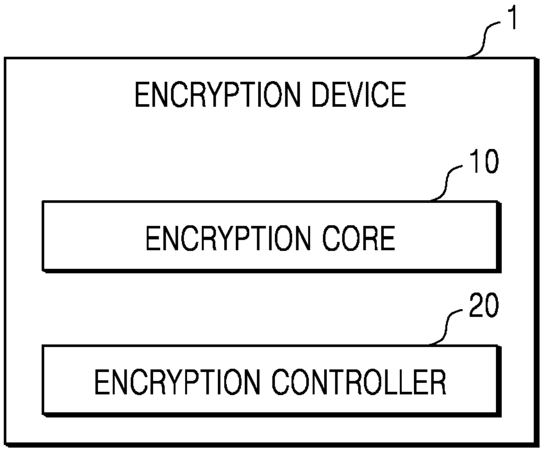
FIG. 1 is a block diagram illustrating an encryption device according to an embodiment.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating an encryption device according to an embodiment.

Referring to FIG. 1, an encryption device 1 according to an embodiment may include an encryption core 10 and an encryption controller 20. The encryption core 10 may also be referred to as an encryption core circuit, and the encryption controller 20 may also be referred to herein as an encryption controller circuit.

The encryption core 10 may generate output data by performing an encryption operation on input data.

The encryption core 10 may include various types of operation circuits. For example, the encryption core 10 may include various types of operation circuits, such as a shiftrow circuit, a security circuit, a mixcolumn addition circuit, a round key addition circuit, and a mixcolumn multiplication elimination circuit. The encryption core 10 may generate output data by performing an encryption operation on input data by performing operations through various types of operation circuits based on a control signal received from the encryption controller 20.

The encryption core 10 may generate output data by performing a plurality of round operations on input data. The plurality of round operations may include, for example, an initial round operation, an iterative round operation of a preset number of times, and a final round operation.

In an embodiment, the first round operation may include a round key addition operation performed by a round key addition operation circuit. The first round operation may be performed in a first operation of encryption on input data. An iterative round operation may be performed after the initial round operation is performed.

In an embodiment, the iterative round operation may include a shiftrow operation performed by a shiftrow circuit, a permutation operation performed by a security circuit, a mixcolumn addition operation performed by a mixcolumn addition circuit, and a round key addition operation performed by a round key addition operation circuit. The iterative round operation may be performed subsequent to a first round operation and may be performed as many as a preset reference number of times. The final round operation may be performed after the iterative round operation is performed as many as a reference number of times.

In an embodiment, the final round operation may include a shiftrow operation performed by a shiftrow circuit, a permutation operation performed by a security circuit, a mixcolumn multiplication elimination operation performed by a mixcolumn multiplication elimination circuit, and a round key addition operation performed by a round key addition operation circuit. By performing the final round operation, final output data in which input data is encrypted may be generated.

The encryption controller 20 may control all operations of the encryption device 1. The encryption controller 20 may control an operation of the encryption core 10 by transmitting a control signal to the encryption core 10.

The encryption controller 20 may control the encryption core 10 to sequentially perform the initial round operation, the iterative round operation of a preset reference number of times, and the final round operation.

Figure 2:
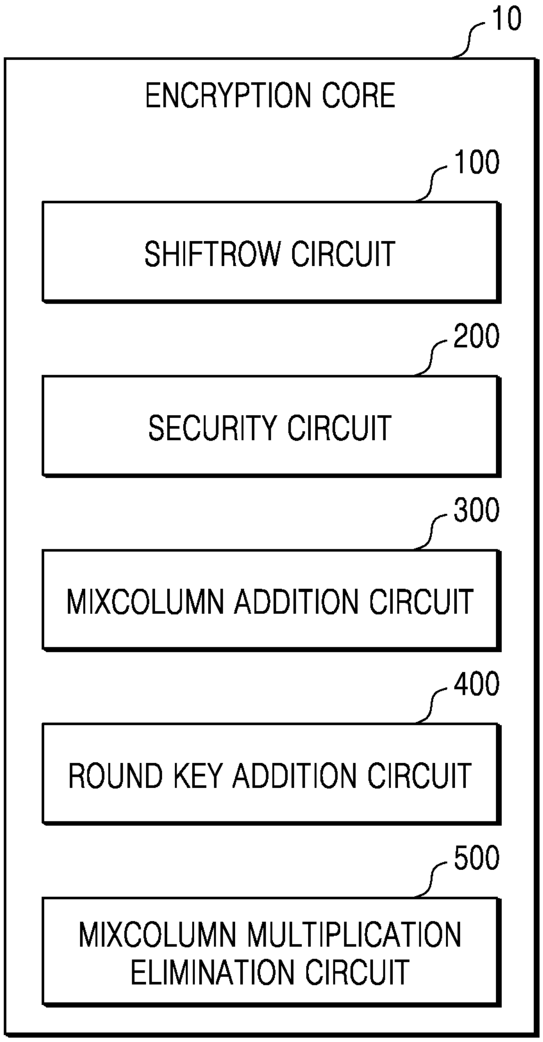
FIG. 2 is a block diagram illustrating an encryption core according to an embodiment.

FIG. 2 is a block diagram illustrating an encryption core according to an embodiment.

Referring to FIG. 2, the encryption core 10 according to an embodiment may include a shiftrow circuit 100, a security circuit 200, a mixcolumn addition circuit 300, a round key addition circuit 400, and a mixcolumn multiplication elimination circuit 500.

The shiftrow circuit 100 may perform a shiftrow operation on input data. The shiftrow circuit 100 may perform a shiftrow operation on input data by cyclically shifting rows of the input data in a cyclic structure.

The shiftrow operation may be represented by Equation 1 below.

$$\begin{bmatrix} x_0 & x_4 & x_8 & x_{12} \\ x_1 & x_5 & x_9 & x_{13} \\ x_2 & x_6 & x_{10} & x_{14} \\ x_3 & x_7 & x_{11} & x_{15} \end{bmatrix} \rightarrow \begin{bmatrix} x_0 & x_4 & x_8 & x_{12} \\ x_5 & x_9 & x_{13} & x_1 \\ x_{10} & x_{14} & x_2 & x_6 \\ x_{15} & x_3 & x_7 & x_{11} \end{bmatrix} \quad \text{[Equation 1]}$$

The shiftrow circuit 100 may generate shift data as a result of performing a shiftrow operation on input data. The shift data generated by the shiftrow circuit 100 may be input to the security circuit 200 under control of the encryption controller 20.

The security circuit 200 may perform a permutation operation including a mixcolumn multiplication operation on the shift data.

The permutation operation may generate permutation data by performing nonlinear permutation on the shift data. In an embodiment, the permutation operation may be an operation for permutation on a result of performing a mixcolumn multiplication operation on a result of passing the received shift data through an S-Box. That is, in an embodiment, the permutation operation may be a permutation operation for passing through a T-box that permutates with a result of performing a mixcolumn multiplication operation on a result that the received shift data passes through the S-Box. In this case, the T-Box is similar to the S-Box but may be a box for permutation to reflect a result of performing a mixcolumn multiplication operation.

In this case, the mixcolumn operation may be a matrix multiplication operation between input data and a preset mixcolumn matrix. For example, for the sake of simplicity of description, a mixcolumn operation between a data matrix and a mixcolumn matrix, which are represented by a 2*2 matrix, may be represented by Equation 2 below.

$$D*M = \begin{bmatrix} D_1 & D_2 \\ D_3 & D_4 \end{bmatrix} * \begin{bmatrix} M_1 & M_2 \\ M_3 & M_4 \end{bmatrix} = \begin{bmatrix} D_1*M_1+D_2*M_3 & D_1*M_2+D_2*M_4 \\ D_3*M_1+D_4*M_3 & D_3*M_2+D_4*M_4 \end{bmatrix} = R \quad \text{[Equation 2]}$$

In Equation 2, a matrix D may be a data matrix, a matrix M may be a mixcolumn matrix, and a matrix R may be a mixcolumn operation result matrix. Each element of the mixcolumn operation result matrix R may be represented by the product and sum of elements of the data matrix D and the mixcolumn matrix M.

The mixcolumn operation may be divided into a mixcolumn multiplication operation and a mixcolumn sum operation. In this case, the mixcolumn multiplication operation may correspond to an operation for multiplying respective elements of matrices in a matrix multiplication operation, and the mixcolumn sum operation may correspond to a sum operation between results of multiplication between respective elements of matrices in a matrix multiplication operation.

For example, in (1,1) element of the mixcolumn operation result matrix R of Equation 2, D1*R1 and D2*R3 may be classified as a mixcolumn multiplication operation and the sum operation of the results of D1*R1 and D2*R3 may be classified as a mixcolumn sum operation.

That is, the security circuit 200 may perform a permutation operation of passing through a T-Box that permutates with a result of performing the mixcolumn multiplication operation described above on a result of passing the shift data through an S-Box.

The security circuit 200 may generate permutation data as a result of performing a permutation operation, which includes a mixcolumn multiplication operation, on the shift data. The permutation data generated by the security circuit 200 may be input to the mixcolumn addition circuit 300 or the mixcolumn multiplication elimination circuit 500 under control of the encryption controller 20.

A more detailed structure and an operation of the security circuit 200 are described below with reference to FIGS. 3 to 7.

The mixcolumn addition circuit 300 may perform a mixcolumn addition operation on the permutation data. The mixcolumn addition circuit 300 may perform a mixcolumn addition operation on the permutation data including to which the result of the mixcolumn multiplication operation generated by the security circuit 200 is also reflected. That is, the mixcolumn addition circuit 300 may complete the mixcolumn operation in which the mixcolumn multiplication operation is performed by the security circuit 200.

The mixcolumn addition circuit 300 may generate first mid data as a result of performing the mixcolumn addition operation on the permutation data. The first mid data generated by the mixcolumn addition circuit 300 may be input to the round key addition operation circuit 400 under control of the encryption controller 20.

A more detailed structure and an operation of the mixcolumn addition circuit 300 are described below with reference to FIG. 12.

The round key addition operation circuit 400 may perform a round key addition operation on the first mid data. The round key addition operation circuit 400 may perform a round key addition operation by performing a bitwise combinatorial logic operation (for example, an exclusive OR operation (XOR)) between the first mid data and a round key.

The round key addition operation circuit 400 may generate output data as a result of performing the round key addition operation on the first mid data. The output data generated by the round key addition operation circuit 400 may be used in the next round operation under control of the encryption controller 20. For example, when the output data generated by the round key addition operation circuit 400 is generated in an initial round operation or an iterative round operation, the output data may be used in a next iterative round operation or a final round operation.

The round key addition operation circuit 400 may generate output data by performing a round key addition operation on a second mid data generated by the mixcolumn multiplication elimination circuit 500 to be described below.

The output data generated by performing the round key addition operation on the second mid data by the round key addition operation circuit 400 may be used as final output data. For example, when the output data generated by the round key addition operation circuit 400 is generated in the final round operation, the output data may be used as final output data obtained by encrypting the input data.

The mix-column multiplication elimination circuit 500 may perform a mix-column multiplication elimination operation on permutation data. The mixcolumn multiplication elimination circuit 500 may perform an operation of converting the permutation data, to which a result of the mixcolumn multiplication operation generated by the security circuit 200 is reflected, into data on which the mixcolumn multiplication operation is not performed. That is, the mixcolumn multiplication elimination circuit 500 may convert data on which the mixcolumn multiplication operation is performed into data on which the mixcolumn multiplication operation is not performed.

In this way, the encryption core 10 does not include an additional security circuit that generates permutation data as a result of performing a permutation operation, which does not include a mixcolumn multiplication operation, on shift data, separately from the security circuit 200, and includes a mixcolumn multiplication elimination circuit 500, and thus, an increase in the area occupied by the encryption core 10 may be greatly reduced. The encryption core 10 may also be referred to as a cryptographic core.

The mixcolumn multiplication elimination circuit 500 may generate the second mid data as a result of performing a mixcolumn multiplication elimination operation on the permutation data. The second mid data generated by the mixcolumn multiplication elimination circuit 500 may be input to the round key addition operation circuit 400 under control of the encryption controller 20.

As described above, when the encryption device 1 according to an embodiment of the inventive concept is used, permutation data may be generated by performing a permutation operation including a mixcolumn multiplication operation on shift data by the security circuit 200, and thus, a critical path may be reduced.

Figure 3:
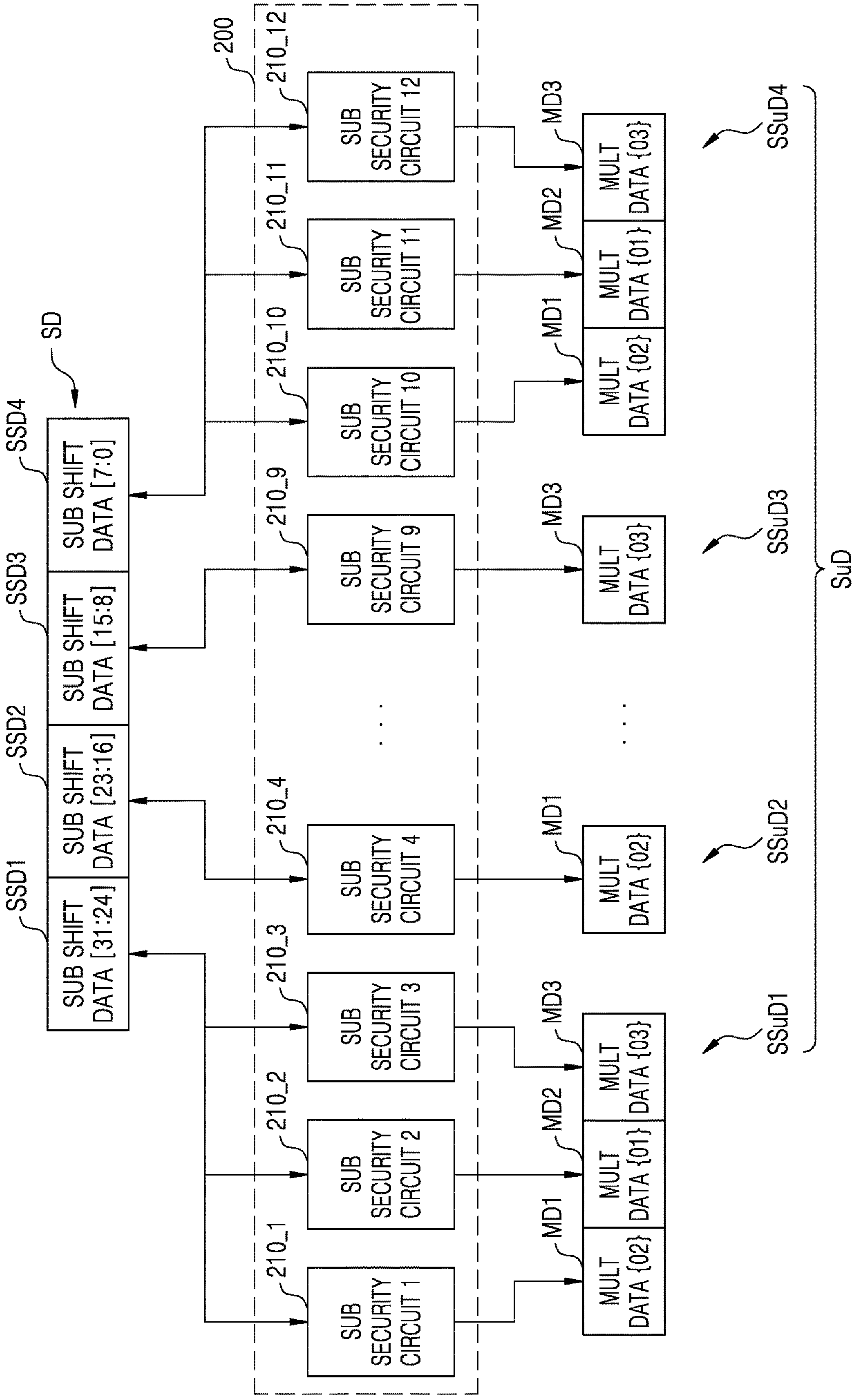
FIG. 3 is a block diagram illustrating a detailed configuration of a security circuit and an example of data input and output to and from the security circuit according to an embodiment.

FIG. 3 is a block diagram illustrating a detailed configuration of a security circuit and an example of data input and output to and from the security circuit according to an embodiment.

Referring to FIG. 3, in an embodiment, the security circuit 200 may receive shift data SD.

The shift data SD may be divided into first to fourth sub shift data SSD1 to SSD4. The first to fourth sub shift data SSD1 to SSD4 are data generated by dividing the shift data SD into data having the same size, and may become the shift data SD by connecting the first to fourth sub shift data SSD1 to SSD4 to each other. In an embodiment of FIG. 3, the shift data SD includes 32 bits total, and the shift data SD may be divided into 4 pieces. In this case, the first sub shift data SSD1 may include the most significant 8 bits of the shift data SD, the second sub shift data SSD2 may include upper 8 bits following the first sub shift data SSD1, the third sub shift data SSD3 may include upper 8 bits following the second sub shift data SSD2, and the fourth sub shift data SSD4 may include the least significant 8 bits of the shift data SD.

In an embodiment of FIG. 3, the security circuit 200 may include first to twelfth sub security circuits 210_1 to 210_12.

In an embodiment of FIG. 3, the number of security circuits (for example, the first to twelfth sub security circuits 210_1 to 210_12) may be equal to the number obtained by multiplying the number of pieces of sub shift data (for example, the first to fourth sub shift data SSD1 to SSD4) by the number of mixcolumn multiplication values.

In an embodiment, a mixcolumn matrix used for encryption of input data may be represented by Equation 3 below.

$$\begin{bmatrix} \{02\} & \{03\} & \{01\} & \{01\} \\ \{01\} & \{02\} & \{03\} & \{01\} \\ \{01\} & \{01\} & \{02\} & \{03\} \\ \{03\} & \{01\} & \{01\} & \{02\} \end{bmatrix} \quad \text{[Equation 3]}$$

In this case, three values, such as {01}, {02}, and {03}, which are element values of the mixcolumn matrix, may be referred to as the mixcolumn multiplication values. In an embodiment of FIG. 3, when the number of pieces of sub shift data (for example, the first to fourth sub shift data SSD1 to SSD4) is 4 and the number of mixcolumns multiplication values is 3 as illustrated in Equation 3, the number of sub security circuits (for example, the first to twelfth sub security circuits 210_1 to 210_12) may be 12 in total.

Each of the first to twelfth sub security circuits 210_1 to 210_12 may receive any one of the first to fourth sub shift data SSD1 to SSD4 generated by dividing the shift data SD.

In an embodiment of FIG. 3, the first to third sub security circuits 210_1 to 210_3 may receive the first sub shift data SSD1, the fourth to sixth sub security circuits 210_4 to 210_6 may receive the second sub shift data SSD2, the seventh to ninth sub security circuits 210_7 to 210_9 may receive the third sub shift data SSD3, and the tenth to twelfth sub security circuits 210_10 to 210_12 may receive the fourth sub shift data SSD4.

Each of the first to twelfth sub security circuits 210_1 to 210_12 may perform a permutation operation, which includes a mixcolumn multiplication operation on any one of a plurality of mixcolumn multiplication values, on the received sub shift data. Each of the first to twelfth sub security circuits 210_1 to 210_12 may generate any one of first to third multiplication data MD1 to MD3 included in first to fourth sub permutation data SSuD1 to SSuD4 by performing a permutation operation.

In an embodiment of FIG. 3, permutation data SuD may include the first to fourth sub permutation data SSuD1 to SSuD4. The permutation data SuD may have a form in which the first to fourth sub permutation data SSuD1 to SSuD4 are sequentially connected to each other. In this case, each of the first to fourth sub permutation data SSuD1 to SSuD4 may include the first to third multiplication data MD1 to MD3. Each of the first to fourth sub permutation data SSuD1 to SSuD4 may have a form in which the first to third multiplication data MD1 to MD3 are sequentially connected to each other.

In an embodiment of FIG. 3, the first sub security circuit 210_1 may perform a permutation operation, which includes a mixcolumn multiplication operation on the mixcolumn multiplication value {02}, on the first sub shift data SSD1. The first sub security circuit 210_1 may generate the first multiplication data MD1 included in the first sub permutation data SSuD1 as a result of the permutation operation.

In an embodiment of FIG. 3, the second sub security circuit 210_2 may perform a permutation operation, which includes a mixcolumn multiplication operation on the mixcolumn multiplication value {01}, on the first sub shift data SSD1. The second sub security circuit 210_2 may generate the second multiplication data MD2 included in the first sub permutation data SSuD1 as a result of the permutation operation.

In an embodiment of FIG. 3, the third sub security circuit 210_3 may perform a permutation operation, which includes a mixcolumn multiplication operation on the mixcolumn multiplication value {03}, on the first sub shift data SSD1. The third sub security circuit 210_3 may generate the third multiplication data MD3 included in the first sub permutation data SSuD1 as a result of the permutation operation.

In an embodiment of FIG. 3, the fourth sub security circuit 210_4 may generate the first multiplication data MD1 included in the second sub permutation data SSuD2 by performing a permutation operation, which includes a mixcolumn multiplication operation on the mixcolumn multiplication value {02}, on the second sub shift data SSD2. The fifth sub security circuit 210_5 may generate the second multiplication data MD2 included in the second sub permutation data SSuD2 by performing a permutation operation, which includes a mixcolumn multiplication operation on the mixcolumn multiplication value {01}, on the second sub shift data SSD2. The sixth sub security circuit 210_6 may generate the third multiplication data MD3 included in the second sub permutation data SSuD2 by performing a permutation operation, which includes a mixcolumn multiplication operation on the mixcolumn multiplication value {03}, on the second sub shift data SSD2.

In an embodiment of FIG. 3, the seventh sub security circuit 210_7 may generate the first multiplication data MD1 included in the third sub permutation data SSuD3 by performing a permutation operation, which includes a mixcolumn multiplication operation on the mixcolumn multiplication value {02}, on the third sub shift data SSD3. The eighth sub security circuit 210_8 may generate the second multiplication data MD2 included in the third sub permutation data SSuD3 by performing a permutation operation, which includes a mixcolumn multiplication operation on the mixcolumn multiplication value {01}, on the third sub shift data SSD3. The ninth sub security circuit 210_9 may generate the third multiplication data MD3 included in the third sub permutation data SSuD3 by performing a permutation operation, which includes a mixcolumn multiplication operation on the mixcolumn multiplication value {03}, on the third sub shift data SSD3.

In an embodiment of FIG. 3, the tenth sub security circuit 210_10 may generate the first multiplication data MD1 included in the fourth sub permutation data SSuD4 by performing a permutation operation, which includes a mixcolumn multiplication operation on the mixcolumn multiplication value {02}, on the fourth sub shift data SSD4. The eleventh sub security circuit 210_11 may generate the second multiplication data MD2 included in the fourth sub permutation data SSuD4 by performing a permutation operation, which includes a mixcolumn multiplication operation on the mixcolumn multiplication value {01}, on the fourth sub shift data SSD4. The twelfth sub security circuit 210_12 may generate the third multiplication data MD3 included in the fourth sub permutation data SSuD4 by performing a permutation operation, which includes a mixcolumn multiplication operation on the mixcolumn multiplication value {03}, on the fourth sub shift data SSD4.

In this case, each of the first to twelfth sub security circuits 210_1 to 210_12 may receive sub shift data different from other sub security circuits or perform a permutation operation including a mixcolumn multiplication operation on different mixcolumn multiplication values. For example, the first sub security circuit 210_1 may receive the same sub shift data as the second sub security circuit 210_2 but may perform a permutation operation including a mixcolumn multiplication operation on different mixcolumn multiplication values. Also, the first sub security circuit 210_1 may perform a permutation operation including a mixcolumn multiplication operation on the same mixcolumn multiplication value as the fourth sub security circuit 210_4 but may receive different sub shift data.

A more detailed structure of the first to twelfth sub security circuits 210_1 to 210_12 is described with reference to FIG. 4.

Figure 4:
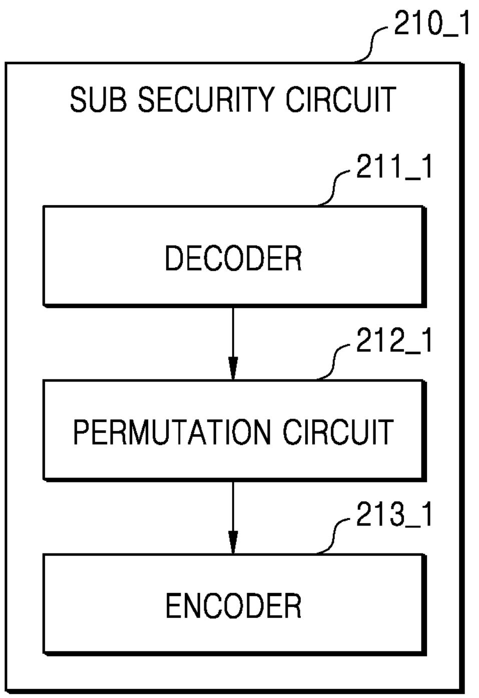
FIG. 4 is a block diagram illustrating an example in which a sub security circuit illustrated in FIG. 3 includes one encoder.

FIG. 4 is a block diagram illustrating an example in which the sub security circuit illustrated in FIG. 3 includes one encoder.

Referring to FIG. 4, a first sub security circuit 210_1 according to an embodiment may include a decoder 211_1, a permutation circuit 212_1, and an encoder 213_1. The decoder 211_1 may also be referred to as a decoder circuit, and the encoder 213_1 may also be referred to as an encoder circuit. The second to twelfth sub security circuits 210_2 to 210_12 other than the first sub security circuit 210_1 may each also have the same structure as the first sub security circuit 210_1.

The decoder 211_1 may decode the received sub shift data and output a decoded value. In an embodiment, the decoder 211_1 may include a plurality of logic gates. The decoder 211_1 may receive sub shift data and inverted sub shift data through the plurality of logic gates. The decoder 211_1 may pass the received sub shift data and the inverted sub shift data through a plurality of logic gates, thereby decoding the received sub shift data and outputting a decoded value.

The permutation circuit 212_1 may output a selected permutation value based on the decoded value. In an embodiment, the permutation circuit 212_1 may select any one of a plurality of integers based on the decoded value and output the selected value as a permutation value.

The encoder 213_1 may generate multiplication data by encoding the permutation value to represent a result of a mixcolumn multiplication operation on any one of a plurality of mixcolumn multiplication values. In an embodiment, the encoder 213_1 may receive the permutation value through a plurality of logic gates. The encoder 213_1 may pass the permutation value through the plurality of logic gates, thereby encoding the permutation value to represent the result of the mixcolumn multiplication operation on any one of the plurality of mixcolumn multiplication values to generate the multiplication data.

In this way, when the security circuit 200 according to an embodiment of the inventive concept is used, the encoder 213_1 may perform encoding to represent a result of a mixcolumn multiplication operation, and accordingly, a critical path may be reduced.

Figure 5:
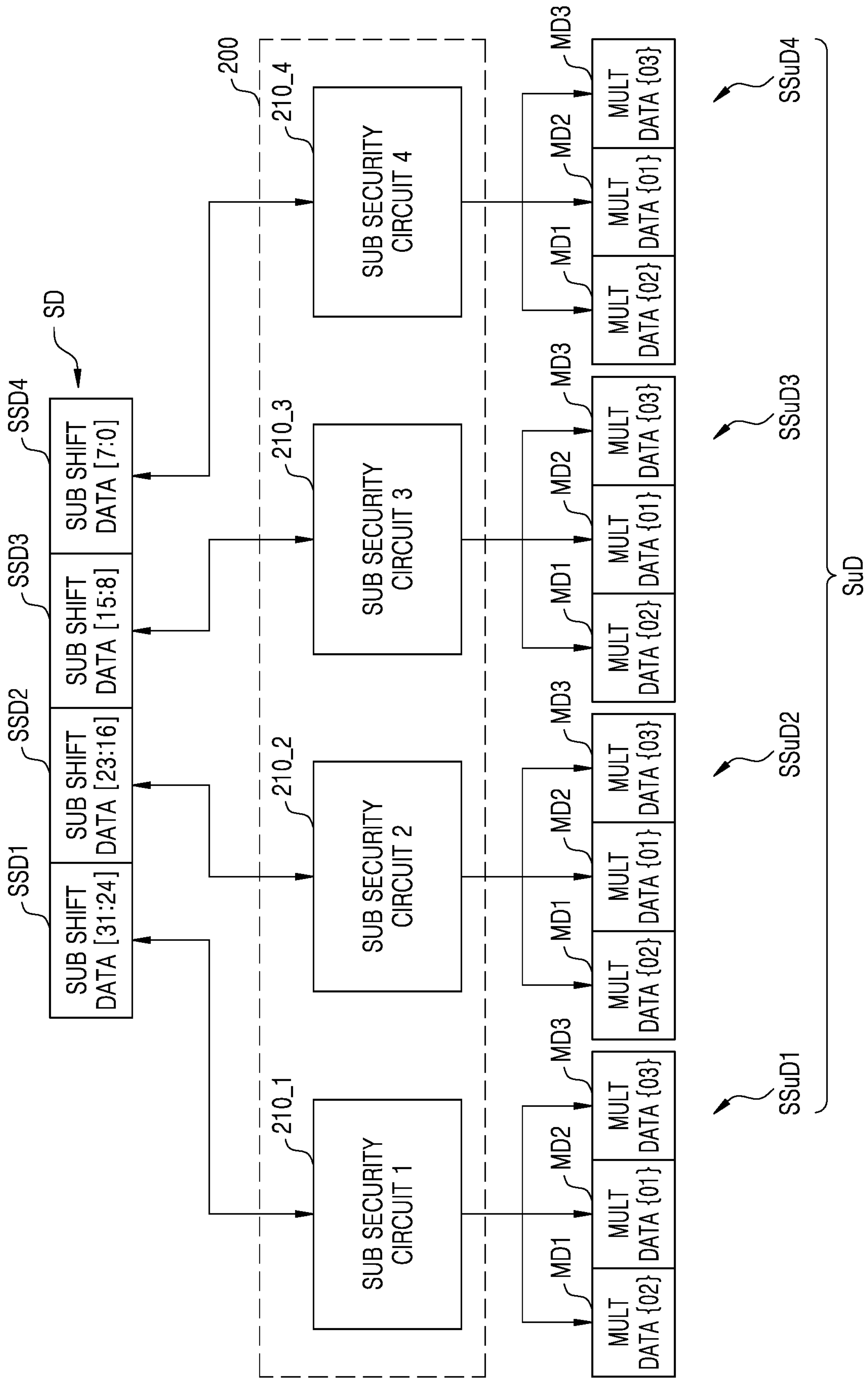
FIG. 5 is a block diagram illustrating a detailed configuration of a security circuit and an example of data input and output to and from the security circuit according to an embodiment.

FIG. 5 is a block diagram illustrating a detailed configuration of a security circuit and an example of data input and output to and from the security circuit according to an embodiment.

Referring to FIG. 5, in an embodiment, a security circuit 200 may receive shift data SD.

In an embodiment of FIG. 5, the security circuit 200 may include first to fourth sub security circuits 210_1 to 210_4.

In an embodiment of FIG. 5, the number of sub security circuits (for example, the first to fourth sub security circuits 210_1 to 210_4) may be equal to the number of pieces of sub shift data (for example, the first to fourth sub shift data SSD1 to SSD4).

Each of the first to fourth sub security circuits 210_1 to 210_4 may receive any one of the first to fourth sub shift data SSD1 to SSD4 generated by dividing the shift data SD. In this case, each of the first to fourth sub security circuits 210_1 to 210_4 may receive sub shift data different from sub shift data of other sub security circuits.

In an embodiment of FIG. 5, the first sub security circuit 210_1 may receive the first sub shift data SSD1, the second sub security circuit 210_2 may receive the second sub shift data SSD2, the third sub security circuit 210_3 may receive the third sub shift data SSD3, and the fourth sub security circuit 210_4 may receive the fourth sub shift data SSD4.

Each of the first to fourth sub security circuits 210_1 to 210_4 may perform a permutation operation including a mixcolumn multiplication operation on the sub shift data. The first to fourth sub security circuits 210_1 to 210_4 may generate first to fourth sub permutation data SSuD1 to SSuD4, each including first to third multiplication data MD1 to MD3, by performing permutation operations.

In an embodiment of FIG. 5, the first sub security circuit 210_1 may perform a permutation operation, which includes a mixcolumn multiplication operation on the mixcolumn multiplication values {02}, {01}, and {03}, on the first sub shift data SSD1. The first sub security circuit 210_1 may generate first sub permutation data SSuD1 including the first to third multiplication data MD1 to MD3 as a result of a permutation operation. In this case, the first sub security circuit 210_1 may generate the first multiplication data MD1 by performing a permutation operation, which includes a mixcolumn multiplication operation on the mixcolumn multiplication value {02}, on the first sub shift data SSD1. The first sub security circuit 210_1 may generate the second multiplication data MD2 by performing a permutation operation, which includes a mixcolumn multiplication operation on the mixcolumn multiplication value {01}, on the first sub shift data SSD1. The first sub security circuit 210_1 may generate the third multiplication data MD3 by performing a permutation operation, which includes a mixcolumn multiplication operation on the mixcolumn multiplication value {03}, on the first sub shift data SSD1.

In an embodiment of FIG. 5, the second sub security circuit 210_2 may generate the second sub permutation data SSuD2 including the first to third multiplication data MD1 to MD3 by performing a permutation operation, which includes a mixcolumn multiplication operation on the mixcolumn multiplication values {02}, {01}, and {03}, on the second sub shift data SSD2. The third sub security circuit 210_3 may generate the third sub permutation data SSuD3 including the first to third multiplication data MD1 to MD3 by performing a permutation operation, which includes a mixcolumn multiplication operation on the mixcolumn multiplication values {02}, {01}, and {03}, on the third sub shift data SSD3. The fourth sub security circuit 210_4 may generate the fourth sub permutation data SSuD4 including the first to third multiplication data MD1 to MD3 by performing a permutation operation, which includes a mixcolumn multiplication operation on the mixcolumn multiplication values {02}, {01}, and {03}, on the fourth sub shift data SSD4.

A more detailed structure of the first to fourth sub security circuits 210_1 to 210_4 is described with reference to FIG. 6.

Figure 6:
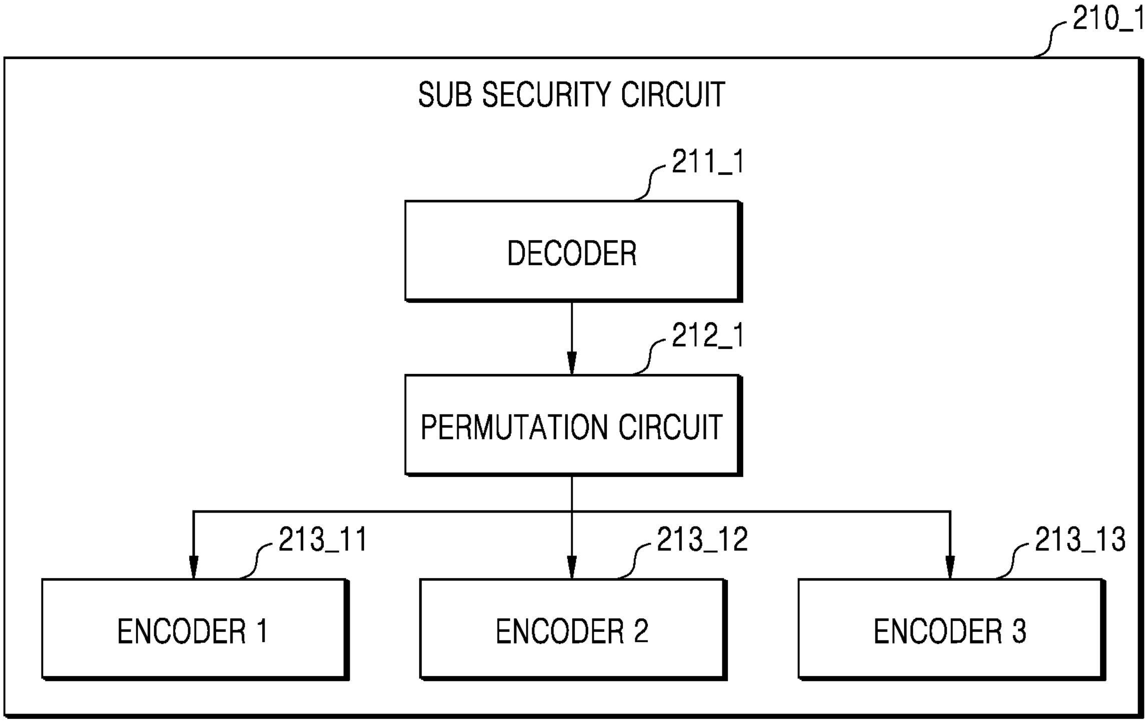
FIG. 6 is a block diagram illustrating an example in which a sub security circuit illustrated in FIG. 5 includes a plurality of encoders.

FIG. 6 is a block diagram illustrating an example in which the sub security circuit illustrated in FIG. 5 includes a plurality of encoders.

Referring to FIG. 6, the first sub security circuit 210_1 according to an embodiment may include a decoder 211_1, a permutation circuit 212_1, a first encoder 213_11, a second encoder 213_12, and a third encoder 213_13. The second to fourth sub security circuits 210_2 to 210_4 other than the first sub security circuit 210_1 may each also have the same structure as the first sub security circuit 210_1.

The decoder 211_1 and the permutation circuit 212_1 may perform the same operations as described with reference to FIG. 4.

The first to third encoders 213_11 to 213_13 may perform the same operations as described with reference to FIG. 4.

In this case, the first to third encoders 213_11 to 213_13 may generate multiplication data by encoding a permutation value to represent a result of a mixcolumn multiplication operation on any one of a plurality of mixcolumn multiplication values. For example, the first encoder 213_11 may generate multiplication data by encoding a permutation value to represent a result of a mixcolumn multiplication operation on the mixcolumn multiplication value {02}. The second encoder 213_12 may generate multiplication data by encoding a permutation value to represent a result of a mixcolumn multiplication operation on the mixcolumn multiplication value {01}. The third encoder 213_13 may generate multiplication data by encoding a permutation value to represent a result of a mixcolumn multiplication operation on the mixcolumn multiplication value {03}.

In this way, when the security circuit 200 according to embodiments of FIGS. 5 and 6 is used, the first to third encoders 213_11 to 213_13 share the same decoder 211_1 and the permutation circuit 212_1, and thus, an increase in a total area of the security circuit 200 may be reduced.

As described above, although an encryption operation of the encryption device 1 is mainly described with reference to FIGS. 1 to 6, the same description may be applied to a decryption operation.

Figure 7:
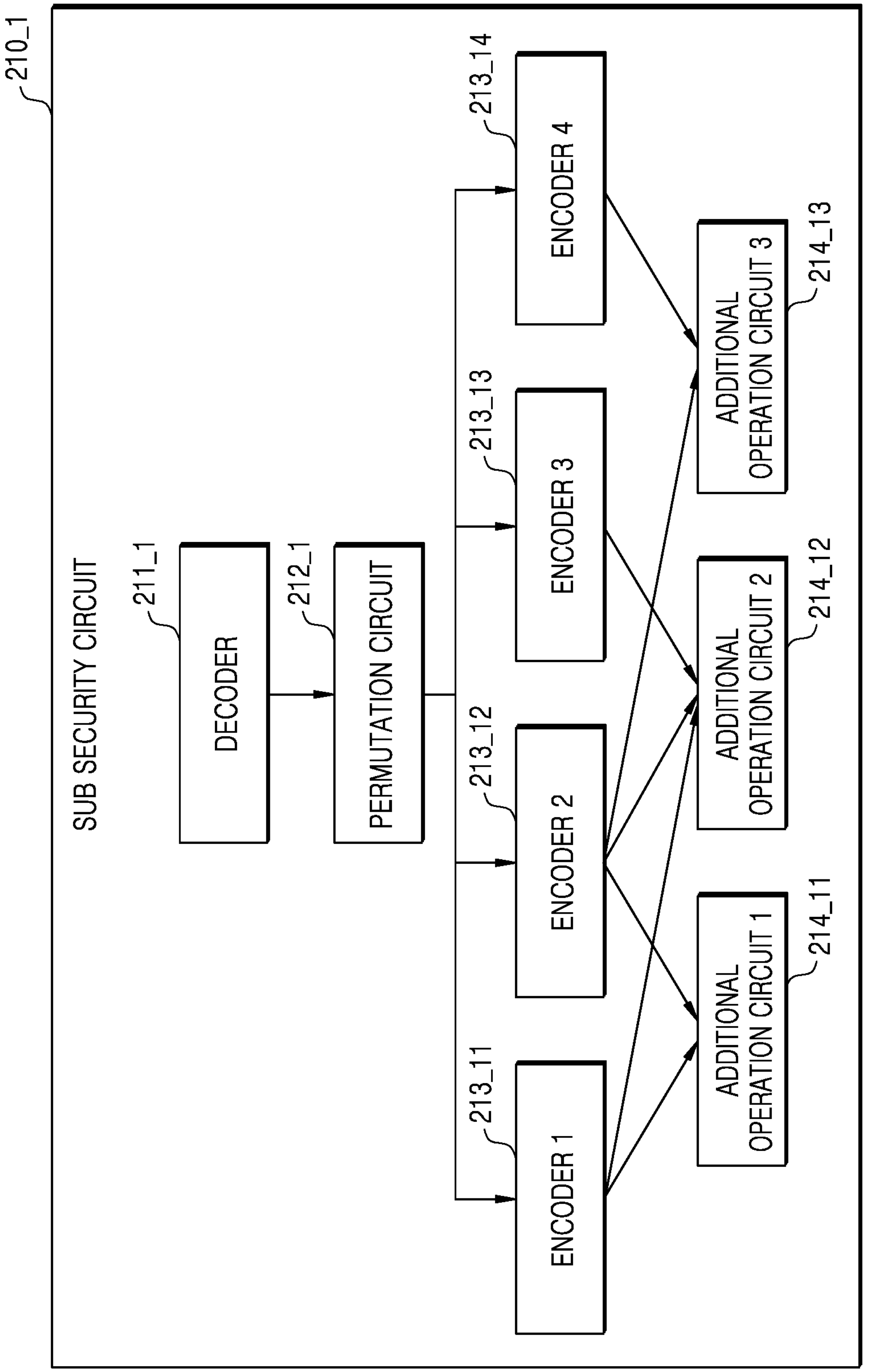
FIG. 7 is a block diagram illustrating an example in which a sub security circuit illustrated in FIG. 5 includes a plurality of encoders and a plurality of additional operation circuits.

FIG. 7 is a block diagram illustrating an example in which the sub security circuit illustrated in FIG. 5 includes a plurality of encoders and a plurality of additional operation circuits.

Referring to FIG. 7, the first sub security circuit 210_1 according to an embodiment may include a decoder 211_1, a permutation circuit 212_1, a first encoder 213_11, a second encoder 213_12, a third encoder 213_13, a fourth encoder 213_14, a first additional operation circuit 214_11, a second additional operation circuit 214_12, and a third additional operation circuit 214_13. The second to fourth sub security circuits 210_2 to 210_4 other than the first sub security circuit 210_1 may each also have the same structure as the first sub security circuit 210_1.

The decoder 211_1 and the permutation circuit 212_1 may perform the same operations as described with reference to FIG. 4.

Although FIG. 6 illustrates an embodiment in which one sub security circuit includes three encoders, FIG. 6 mainly illustrates an encryption operation of the encryption device 1, and an additional encoder is utilized to enable the encryption device 1 to perform the decryption operation.

For example, a mixcolumn matrix used to decode input data may be represented by Equation 4 below.

$$\begin{bmatrix} \{0E\} & \{09\} & \{0B\} & \{0D\} \\ \{0D\} & \{0E\} & \{09\} & \{0B\} \\ \{0B\} & \{0D\} & \{0E\} & \{09\} \\ \{09\} & \{0B\} & \{0D\} & \{0E\} \end{bmatrix} \quad \text{[Equation 4]}$$

In Equation 4, four values, such as {09}, {0B}, {0D}, and {0E}, which are element values of the mixcolumn matrix, may be referred to as a mixcolumn multiplication value. When both an encryption operation and a decryption operation are integrated, seven values, such as {01}, {02}, {03}, {09}, {0B}, {0D}, and {0E}, may be referred to as the mixcolumn multiplication value.

The first to fourth encoders 213_11 to 213_14 may generate multiplication data by encoding a permutation value to represent a result of a mixcolumn multiplication operation on any one of a plurality of mixcolumn multiplication values. In this case, the first to fourth encoders 213_11 to 213_14 may generate multiplication data by encoding a permutation value to represent a result of the mixcolumn multiplication operation on some of the seven total mixcolumn multiplication values. Multiplication data not generated by the first to fourth encoders 213_11 through 213_14 may be generated by the first to third additional operation circuits 214_11 to 214_13.

The first to third additional operation circuits 214_11 to 214_13 may generate one or more pieces of multiplication data not generated by the first to fourth encoders 213_11 to 213_14 among a plurality of pieces of multiplication data based on the multiplication data generated by the first to fourth encoders 213_11 to 213_14. The first to third additional operation circuits 214_11 to 214_13 may generate one or more pieces of multiplication data not generated by the first to fourth encoders 213_11 to 213_14 by performing a logical operation (for example, an XOR operation) between the multiplication data generated by the first to fourth encoders 213_11 to 213_14.

In this case, the multiplication data generated by the first to fourth encoders 213_11 to 213_14 and the multiplication data generated by the first to third additional operation circuits 214_11 to 214_13 may be as illustrated in FIG. 8.

FIG. 8 is a table illustrating an example of a mixcolumn multiplication operation result that may be output through a plurality of encoders and a plurality of additional operation circuits in the sub security circuit of FIG. 7.

Referring to FIG. 8, the table shows whether multiplication data corresponding to a plurality of mixcolumn multiplication values is generated through an encoder or an additional operation circuit and a method of generating the multiplication data corresponding to the mixcolumn multiplication values by the additional operation circuit.

Referring to the table of FIG. 8, the first to fourth encoders 213_11 to 213_14 may generate multiplication data corresponding to mixcolumn multiplication values {01}, {02}, {0D}, and {09}. For example, the first encoder 213_11 may generate multiplication data corresponding to the mixcolumn multiplication value {01}, the second encoder 213_12 may generate multiplication data corresponding to the mixcolumn multiplication value {02}, the third encoder 213_13 may generate multiplication data corresponding to the mixcolumn multiplication value {0D}, and the fourth encoder 213_14 may generate multiplication data corresponding to the mixcolumn multiplication value {09}.

In addition, the first to third additional operation circuits 214_11 to 214_13 may generate multiplication data corresponding to the mixcolumn multiplication values {03}, {0E}, and {0B}. For example, the first additional operation circuit 214_11 may generate multiplication data corresponding to the mixcolumn multiplication value {03} by performing an XOR operation between the multiplication data corresponding to the mixcolumn multiplication value {01} and the multiplication data corresponding to the mixcolumn multiplication value {02}. The second additional operation circuit 214_12 may generate multiplication data corresponding to the mixcolumn multiplication value {0E} by performing an XOR operation between the multiplication data corresponding to the mixcolumn multiplication value {0D}, the multiplication data corresponding to the mixcolumn multiplication value {01}, and the multiplication data corresponding to the mixcolumn multiplication value {02}. The third additional operation circuit 214_13 may generate multiplication data corresponding to the mixcolumn multiplication value {0B} by performing an XOR operation between the multiplication data corresponding to the mixcolumn multiplication value {09} and the multiplication data corresponding to the mixcolumn multiplication value {02}.

As described above, when the security circuit 200 including the sub security circuit 210_1 according to embodiments of FIGS. 7 and 8 is used, the number of encoders may be greatly reduced by using the first to third additional operation circuits 214_11 to 214_13, and thus, an increase in the total area of the security circuit 200 may be reduced.

FIG. 9 is a table illustrating a setting method of the mixcolumn multiplication operation result that may be output through a plurality of encoders and a plurality of additional operation circuits in the sub security circuit of FIG. 7.

Referring to FIG. 9, the table shows another setting method of a mix-column multiplication operation result that may be generated through the first to fourth encoders 213_11 to 213_14 and the first to third additional operation circuits 214_11 to 214_13 in the sub security circuit 210_1 according to an embodiment of FIG. 7.

Referring to the table illustrated in FIG. 9, the multiplication data corresponding to the mixcolumn multiplication value {01} may be obtained by performing an XOR operation between the multiplication data corresponding to the mixcolumn multiplication value {02} and the multiplication data corresponding to the mixcolumn multiplication value {03}.

The multiplication data corresponding to the mixcolumn multiplication value {09} may be obtained by performing an XOR operation between the multiplication data corresponding to the mixcolumn multiplication value {02} and the multiplication data corresponding to the mixcolumn multiplication value {0B}.

The multiplication data corresponding to the mixcolumn multiplication value {0B} may be obtained by performing an XOR operation between the multiplication data corresponding to the mixcolumn multiplication value {02} and the multiplication data corresponding to the mixcolumn multiplication value {09}.

The multiplication data corresponding to the mixcolumn multiplication value {0D} may be obtained by performing an XOR operation between the multiplication data corresponding to the mixcolumn multiplication value {03} and the multiplication data corresponding to the mixcolumn multiplication value {0E}.

The multiplication data corresponding to the mixcolumn multiplication value {0E} may be obtained by performing an XOR operation between the multiplication data corresponding to the mixcolumn multiplication value {03} and the multiplication data corresponding to the mixcolumn multiplication value {0D}.

In this case, in a first method, multiplication data corresponding to the mixcolumn multiplication values {02}, {03}, {09}, and {0D} may be generated by the first to fourth encoders 213_11 to 213_14, and multiplication data corresponding to the mixcolumn multiplication values {01}, {0B}, and {0E} may be generated by the first to third additional operation circuits 214_11 to 214_13.

In a second method, multiplication data corresponding to the mixcolumn multiplication values {02}, {03}, {09}, and {0E} may be generated by the first to fourth encoders 213_11 to 213_14, and multiplication data corresponding to the mixcolumn multiplication values {01}, {0B}, and {0D} may be generated by the first to third additional operation circuits 214_11 to 214_13.

In a third method, multiplication data corresponding to the mixcolumn multiplication values {02}, {03}, {0B}, and {0D} may be generated by the first to fourth encoders 213_11 to 213_14, and multiplication data corresponding to the mixcolumn multiplication values {01}, {09}, and {0E} may be generated by the first to third additional operation circuits 214_11 to 214_13.

In a fourth method, multiplication data corresponding to the mixcolumn multiplication values {02}, {03}, {0B}, and {E} may be generated by the first to fourth encoders 213_11 to 213_14, and multiplication data corresponding to the mixcolumn multiplication values {01}, {09}, and {0D} may be generated by the first to third additional operation circuits 214_11 to 214_13.

When multiplication data generated by the first to fourth encoders 213_11 to 213_14 and the first to third additional operation circuits 214_11 to 214_13 is set by using the table illustrated in FIG. 9, output timing of the multiplication data generated by the first to third additional operation circuits 214_11 to 214_13 may be set identically to the first to third additional operation circuits 214_11 to 214_13 and may perform the same number of XOR operations.

FIG. 10 is a table illustrating an example in which a mixcolumn multiplication operation result may be generated by a configuration of a sub security circuit, according to an embodiment.

Referring to FIG. 10, a setting method of a mixcolumn multiplication operation result that may be generated by five encoders and seven additional operation circuits is illustrated, unlike the circuit illustrated in FIG. 7.

Referring to the table illustrated in FIG. 10, multiplication data corresponding to the mixcolumn multiplication value {01} may be obtained by performing an XOR operation between multiplication data corresponding to the mixcolumn multiplication value {02} and multiplication data corresponding to the mixcolumn multiplication value {03}.

The multiplication data corresponding to the mixcolumn multiplication value {02} may be obtained by performing an XOR operation between the multiplication data corresponding to the mixcolumn multiplication value {01} and multiplication data corresponding to the mixcolumn multiplication value {03}.

The multiplication data corresponding to the mixcolumn multiplication value {03} may be obtained by performing an XOR operation between the multiplication data corresponding to the mixcolumn multiplication value {01} and multiplication data corresponding to the mixcolumn multiplication value {02}.

Multiplication data corresponding to the mixcolumn multiplication value {09} may be obtained by performing an XOR operation between the multiplication data corresponding to the mixcolumn multiplication value {01} and multiplication data corresponding to the mixcolumn multiplication value {08}, or by performing an XOR operation between the multiplication data corresponding to the mixcolumn multiplication value {03} and multiplication data corresponding to the mixcolumn multiplication value {0A}.

Multiplication data corresponding to the mixcolumn multiplication value {0B} may be obtained by performing an XOR operation between the multiplication data corresponding to the mixcolumn multiplication value {03} and the multiplication data corresponding to the mixcolumn multiplication value {08}, or by performing an XOR operation between the multiplication data corresponding to the mixcolumn multiplication value {01} and the multiplication data corresponding to the mixcolumn multiplication value {0A}.

Multiplication data corresponding to the mixcolumn multiplication value {0D} may be obtained by performing an XOR operation between the multiplication data corresponding to the mixcolumn multiplication value {01} and multiplication data corresponding to the mixcolumn multiplication value {0C}, or by performing an XOR operation between the multiplication data corresponding to the mixcolumn multiplication value {02} and multiplication data corresponding to the mixcolumn multiplication value {OF}.

Multiplication data corresponding to the mixcolumn multiplication value {0E} may be obtained by performing an XOR operation between the multiplication data corresponding to the mixcolumn multiplication value {02} and multiplication data corresponding to the mixcolumn multiplication value {0C}, or by performing an XOR operation between the multiplication data corresponding to the mixcolumn multiplication value {01} and multiplication data corresponding to the mixcolumn multiplication value {OF}.

In this case, by utilizing five encoders, multiplication data corresponding to the mixcolumn multiplication values {01}, {02}, and {03} may be generated, any one of multiplication data corresponding to the mixcolumn multiplication values {08} and {A} may be generated, any one of multiplication values {0C} and {OF} may be generated, and multiplication data corresponding to the mix column multiplication values {01}, {02}, {03}, {09}, {0B}, {0D}, and {0E} may be generated by seven additional operation circuits.

When multiplication data generated by five encoders and seven additional operation circuits is set by using the table illustrated in FIG. 10, output timing of all multiplication data may be set identically as all multiplication data is generated through an XOR operation of an additional operation circuit.

FIG. 11 is a table illustrating an example in which a mixcolumn multiplication operation result may be generated by a configuration of a sub security circuit, according to an embodiment.

Referring to FIG. 11, a setting method of a mixcolumn multiplication operation result that may be generated by five encoders and three additional operation circuits is illustrated, unlike the circuit illustrated in FIG. 7.

Referring to the table illustrated in FIG. 11, multiplication data corresponding to the mixcolumn multiplication value {01} may be obtained by performing an XOR operation between multiplication data corresponding to the mixcolumn multiplication value {08} and multiplication data corresponding to the mixcolumn multiplication value {09}, by performing an XOR operation between multiplication data corresponding to the mixcolumn multiplication value {0A} and multiplication data corresponding to the mixcolumn multiplication value {0B}, by performing an XOR operation between multiplication data corresponding to the mixcolumn multiplication value {0C} and multiplication data corresponding to the mixcolumn multiplication value {0D}, or by performing an XOR operation between multiplication data corresponding to the mixcolumn multiplication value {0E} and multiplication data corresponding to the mixcolumn multiplication value {OF}.

Multiplication data corresponding to the mixcolumn multiplication value {02} may be obtained by performing an XOR operation between the multiplication data corresponding to the mixcolumn multiplication value {09} and the multiplication data corresponding to the mixcolumn multiplication value {0B}.

Multiplication data corresponding to the mixcolumn multiplication value {03} may be obtained by performing an XOR operation between the multiplication data corresponding to the mixcolumn multiplication value {0D} and the multiplication data corresponding to the mixcolumn multiplication value {0E}.

In this case, multiplication data corresponding to the mixcolumn multiplication values {08}, {09}, {0B}, {0D}, and {0E} may be generated by five encoders, and multiplication data corresponding to the mixcolumn multiplication values {01}, {02}, and {03} may be generated by three additional operation circuits.

When the multiplication data generated by the five encoders and the three additional operation circuits is set by using the table illustrated in FIG. 11, multiplication data used for an encryption operation is generated by three additional operation circuits, and multiplication data used for decryption operation is generated by five encoders, and accordingly, output timing between multiplication data used for encryption may be set identically and output timing between the multiplication data used for decryption may be set identically.

Figure 12:
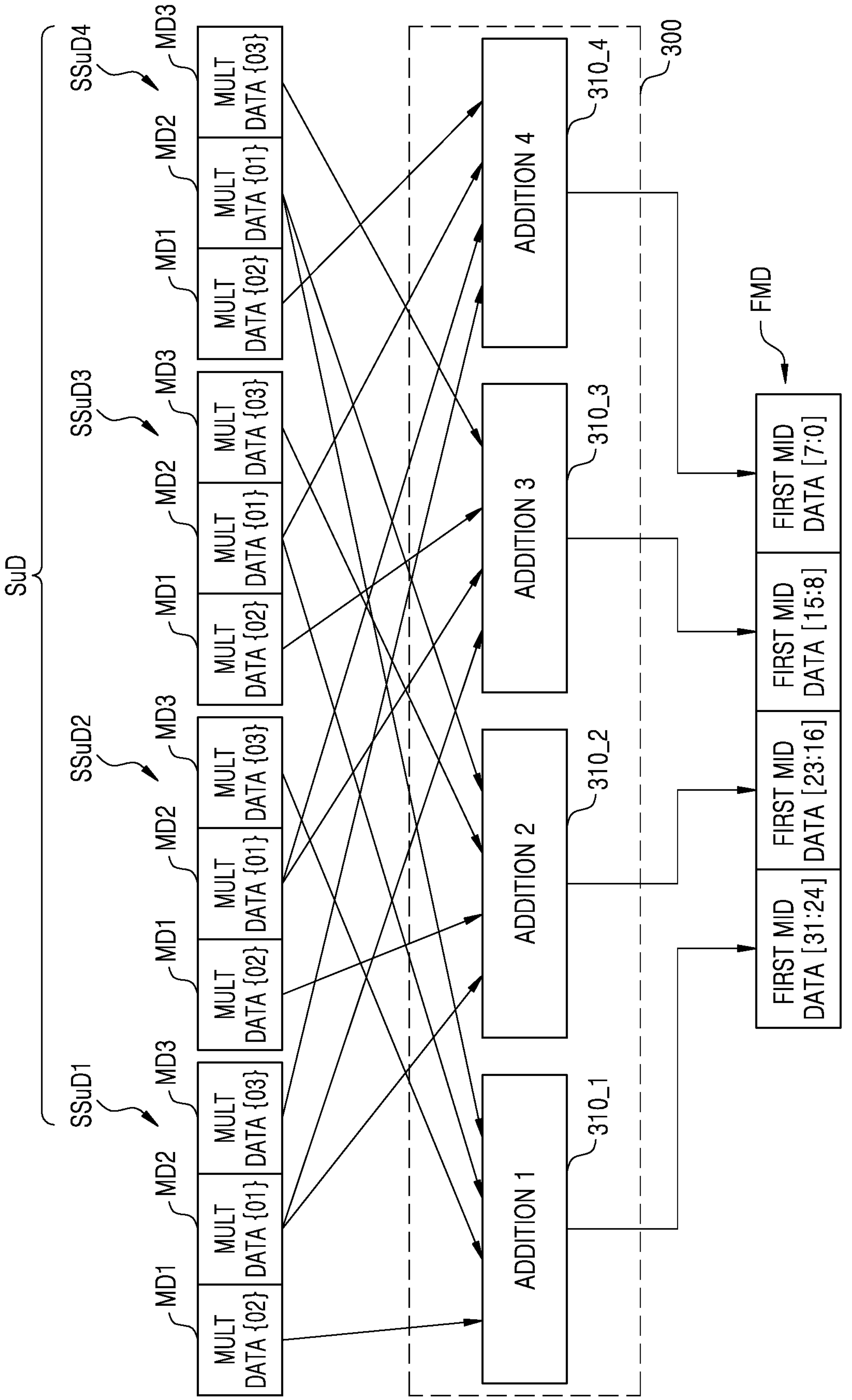
FIG. 12 is a block diagram illustrating a detailed configuration of a mixcolumn addition circuit and an example of data input and output to and from a security circuit according to an embodiment.

FIG. 12 is a block diagram illustrating a detailed configuration of a mixcolumn addition circuit and an example of data input and output to and from a security circuit according to an embodiment.

Referring to FIG. 12, in an embodiment, a mixcolumn addition circuit 300 may receive permutation data SuD. The permutation data SuD may include first to fourth sub permutation data SSuD1 to SSuD4, and each of the first to fourth sub permutation data SSuD1 to SSuD4 may include first to third multiplication data MD1 to MD3.

In an embodiment of FIG. 12, the mixcolumn addition circuit 300 may include first to fourth addition circuits 310_1 to 310_4.

In an embodiment of FIG. 12, the number of addition circuits (for example, the first to fourth addition circuits 310_1 to 310_4) may be equal to the number of pieces of sub shift data (for example, the first to fourth sub shift data SSD1 to SSD4).

The first addition circuit 310_1 may receive the first multiplication data MD1 of the first sub permutation data SSuD1, the third multiplication data MD3 of the second sub permutation data SSuD2, the second multiplication data MD2 of the third sub permutation data SSuD3, and the second multiplication data MD2 of the fourth sub permutation data SSuD4, and may sum the first to third multiplication data MD1 to MD3.

The second addition circuit 310_2 may receive the second multiplication data MD2 of the first sub permutation data SSuD1, the first multiplication data MD1 of the second sub permutation data SSuD2, the third multiplication data MD3 of the third sub permutation data SSuD3, and the second multiplication data MD2 of the fourth sub permutation data SSuD4, and may sum the first to third multiplication data MD1 to MD3.

The third addition circuit 310_3 may receive the second multiplication data MD2 of the first sub permutation data SSuD1, the second multiplication data MD2 of the second sub permutation data SSuD2, the first multiplication data MD1 of the third sub permutation data SSuD3, and the third multiplication data MD3 of the fourth sub permutation data SSuD4, and may sum the first to third multiplication data MD1 to MD3.

The fourth addition circuit 310_4 may receive the third multiplication data MD3 of the first sub permutation data SSuD1, the second multiplication data MD2 of the second sub permutation data SSuD2, the second multiplication data MD2 of the third sub permutation data SSuD3, and the first multiplication data MD3 of the fourth sub permutation data SSuD4, and may sum the first to third multiplication data MD1 to MD3.

In addition, first mid data FMD may be generated by connecting summation results of the first to fourth addition circuits 310_1 to 310_4.

Figure 13:
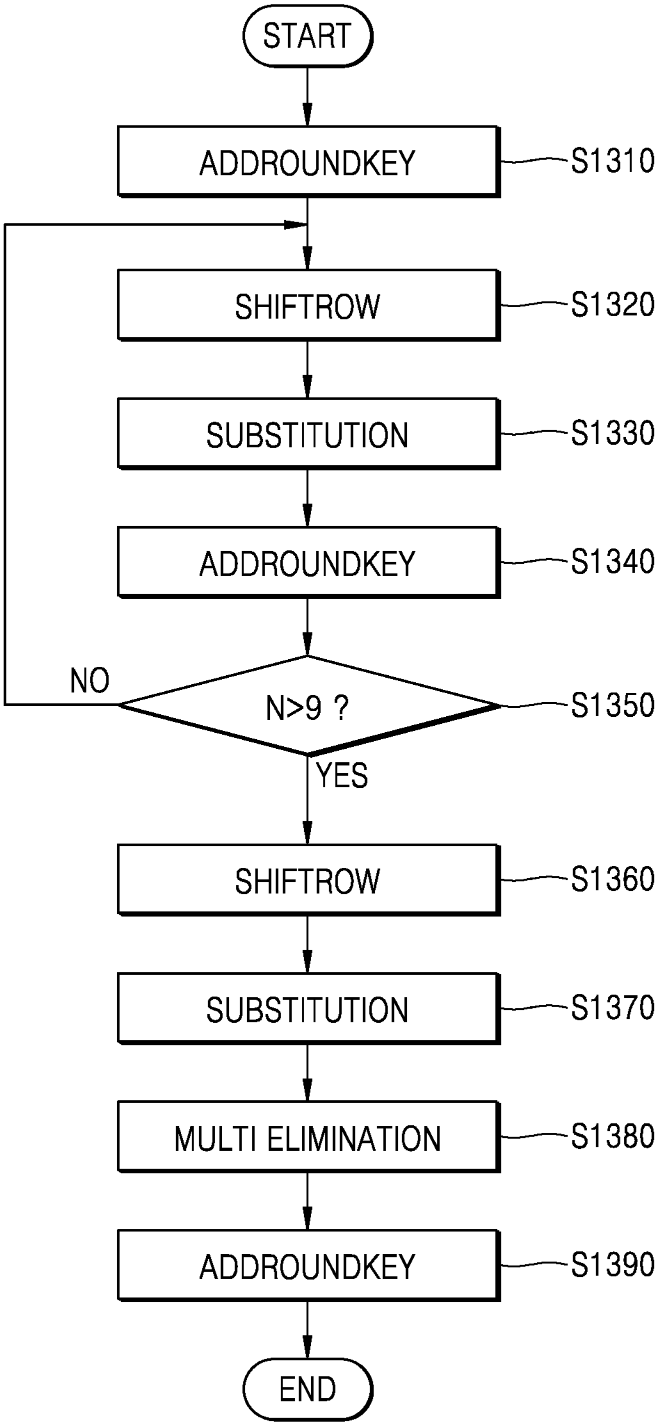
FIG. 13 is a flowchart illustrating an operating method of an encryption device, according to an embodiment.

FIG. 13 is a flowchart illustrating an operating method of an encryption device, according to an embodiment.

Referring to FIG. 13, in operation S1310, the encryption device 1 may perform a round key addition operation. In this case, operation S1310 may correspond to a first round operation.

In operation S1320, the encryption device 1 may perform a shiftrow operation. In operation S1330, the encryption device 1 may perform a permutation operation. In operation S1340, the encryption device 1 may perform a round key addition operation.

In this case, operation S1320 to operation S1340 may correspond to an iterative round operation. Therefore, in operation S1350, whether a repeat number N exceeds a preset reference number (e.g., 9 in an embodiment of FIG. 13) may be determined. When it is determined that the repeat number N does not exceed the preset reference number (e.g., 9 in an embodiment of FIG. 13), the processing may return to operation S1320 to again perform the iterative round operation.

When it is determined that the repeat number N exceeds the preset reference number (e.g., 9 in an embodiment of FIG. 13), the iterative round operation may end and operation S1360 may be performed.

In operation S1360, the encryption device 1 may perform a shiftrow operation. In operation S1370, the encryption device 1 may perform a permutation operation. In operation S1380, the encryption device 1 may perform a mixcolumn multiplication elimination operation. In operation S1390, the encryption device 1 may perform a round key addition operation. In this case, operation S1360 to operation S1390 may correspond to a final round operation.

As a result of the final round operation, encrypted or decrypted final output data may be generated.

Figure 14:
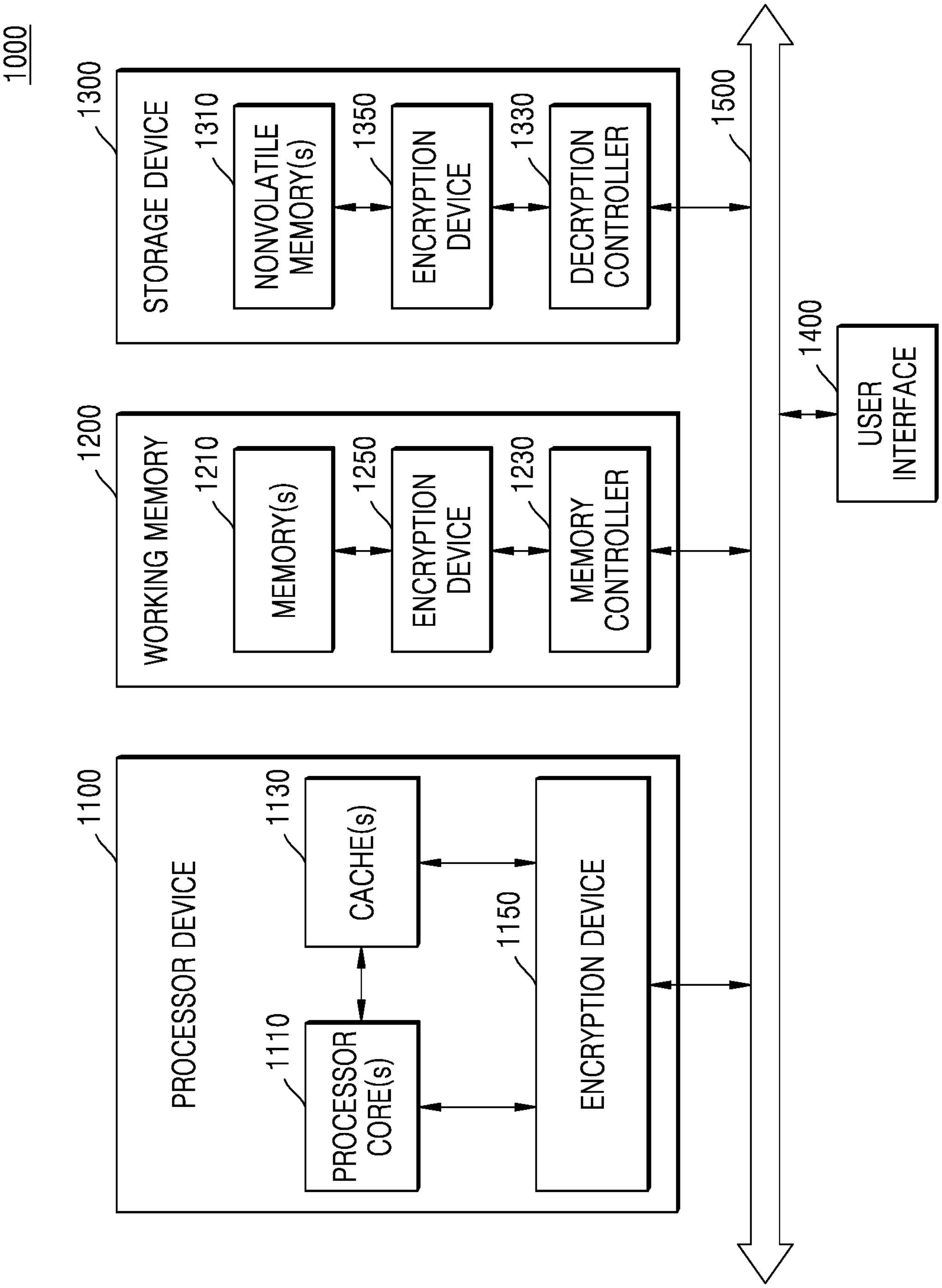
FIG. 14 is a block diagram illustrating a computing device according to an embodiment.

FIG. 14 is a block diagram illustrating a computing device according to an embodiment.

Referring to FIG. 14, the block diagram illustrates a computing device including electronic devices employing an encryption device according to an embodiment. In an embodiment, a computing device 1000 may include a processor device 1100, a working memory 1200, a storage device 1300, a user interface 1400, and a bus 1500.

For example, the computing device 1000 may be one of various electronic devices, such as a desktop computer, a laptop computer, a tablet computer, a workstation, a server, a digital television, a video game console, a smartphone, and a wearable device, but is not limited thereto.

The processor device 1100 may control all operations of the computing device 1000. The processor device 1100 may be configured to process various types of arithmetic operations and/or logical operations. To this end, the processor device 1100 may be implemented by a special-purpose logic circuit (for example, a field programmable gate array (FPGA), an application specific integrated circuit (ASIC), etc.) including one or more processor cores 1110. For example, the processor device 1100 may include a general-purpose processor, a dedicated processor, and/or an application processor.

For example, the processor device 1100 may execute an instruction set of program code by using the processor cores 1110. One or more caches 1130 may temporarily store data generated by executing an instruction set or data to be used for executing the instruction set.

The processor device 1100 may encrypt data output from the processor cores 1110 and/or caches 1130 by using an encryption device 1150. Furthermore, the processor device 1100 may decrypt data to be input to the processor cores 1110 and/or the caches 1130 by using the encryption device 1150.

The working memory 1200 may temporarily store data used for an operation of the computing device 1000. For example, the working memory 1200 may store data processed or to be processed by the processor device 1100 in one or more memories 1210. For example, the memories 1210 may include volatile memories, such as static random access memory (SRAM), dynamic RAM (DRAM), and synchronous DRAM (SDRAM). A memory controller 1230 may control the memories 1210 such that the memories 1210 store data or output the stored data.

The working memory 1200 may encrypt data to be stored in the memories 1210 by using an encryption device 1250. Furthermore, the working memory 1200 may decrypt data output from the memories 1210 by using the encryption device 1250.

The storage device 1300 may store data regardless of power supply. The storage device 1300 may store system data used to operate the computing device 1000 and/or user data for a user of the computing device 1000 in one or more nonvolatile memories 1310. For example, the nonvolatile memories 1310 may include at least one of nonvolatile memories, such as flash memory, phase-change RAM (PRAM), magneto-resistive RAM (MRAM), resistive RAM (ReRAM), and ferro-electric RAM (FRAM). A memory controller 1230 may control the nonvolatile memories 1310 such that the nonvolatile memories 1310 store data or output the stored data. For example, the storage device 1300 may include a storage medium, such as a solid state drive (SSD), a hard disk drive (HDD), a secure digital (SD) card, a multimedia card (MMC), etc.

The storage device 1300 may encrypt data to be stored in the nonvolatile memories 1310 by using an encryption device 1350. Furthermore, the storage device 1300 may decrypt data output from the nonvolatile memories 1310 by using the encryption device 1350.

The user interface 1400 may mediate communication between a user and the computing device 1000 under control of the processor device 1100. For example, the user interface 1400 may process an input from a keyboard, a mouse, a keypad, a button, a touch panel, a touch screen, a touch pad, a touch ball, a camera, a microphone, a gyroscope sensor, a vibration sensor, etc. Furthermore, the user interface 1400 may process an output to a display device, a speaker, or a motor.

The bus 1500 may provide a communication path between components of the computing device 1000. Components of the computing device 1000 may exchange data with each other based on a bus format of the bus 1500. For example, the bus format may include one or more of various communication protocols, such as peripheral component interconnect express (PCIe), nonvolatile memory express (NVMe), small computer system interface (SCSI), advanced technology attachment (ATA), serial ATA (SATA), parallel ATA (PATA), serial attached SCSI (SAS), and universal flash storage (UFS).

In this case, the encryption devices 1150, 1250, and 1350 illustrated in FIG. 14 may be configured by the encryption device 1 described above with reference to FIGS. 1 to 13.

By using the encryption device 1 and an operating method of the encryption device 1 described above, the security circuit 200 may generate permutation data by performing a permutation operation, which includes a mixcolumn multiplication operation, on shift data, and thus, a critical path may be reduced.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and detail may be made therein without departing from the spirit and scope of the inventive concept as defined by the following claims.

What is claimed is:

1. An encryption device, comprising:

an encryption core circuit configured to generate output data by performing an encryption operation on input data; and an encryption controller circuit configured to control an operation of the encryption core circuit, wherein the encryption core circuit comprises:

a shiftrow circuit configured to generate shift data by performing a shiftrow operation on the input data;

a security circuit configured to generate permutation data by performing a permutation operation including a mixcolumn multiplication operation on the shift data based on a plurality of encoding operations under control of the encryption controller circuit;

a mixcolumn addition circuit configured to generate first mid data by performing a mixcolumn addition operation on the permutation data;

a mixcolumn multiplication elimination circuit configured to generate second mid data by performing a mixcolumn multiplication elimination operation on the permutation data; and a round key addition operation circuit configured to generate the output data by performing a round key addition operation on the first mid data and the second mid data.

2. The encryption device of claim 1, wherein:

the security circuit comprises a plurality of sub security circuits configured to receive any one of a plurality of pieces of sub shift data generated by dividing the shift data, and generate any one of a plurality of pieces of multiplication data included in sub permutation data by performing the permutation operation on the sub shift data, the permutation operation includes the mixcolumn multiplication operation on any one of a plurality of mixcolumn multiplication values, and the permutation data includes a plurality of pieces of the sub permutation data.

3. The encryption device of claim 2, wherein the sub shift data received by each of the plurality of sub security circuits is different from each other, or each of the plurality of sub security circuits performs the permutation operation on the mixcolumn multiplication values different from each other, wherein the permutation operation includes the mixcolumn multiplication operation.

4. The encryption device of claim 3, wherein each of the plurality of sub security circuits comprises:

a decoder configured to decode the sub shift data and output a decoded value;

a permutation circuit configured to output a selected permutation value based on the decoded value; and an encoder configured to generate the multiplication data by encoding the selected permutation value to represent a result of the mixcolumn multiplication operation on any one of the plurality of mixcolumn multiplication values.

5. The encryption device of claim 1, wherein:

the security circuit comprises a plurality of sub security circuits configured to receive any one of a plurality of pieces of sub shift data generated by dividing the shift data, and generate sub permutation data including a plurality of pieces of multiplication data by performing the permutation operation including the mixcolumn multiplication operation on the sub shift data, the permutation data includes a plurality of pieces of the sub permutation data, each of the plurality of pieces of multiplication data is generated by performing the permutation operation on the sub shift data, and the permutation operation includes the mixcolumn multiplication operation on any one of a plurality of mixcolumn multiplication values.

6. The encryption device of claim 5, wherein the sub shift data received by each of the plurality of sub security circuits is different from each other.

7. The encryption device of claim 6, wherein each of the plurality of sub security circuits comprises:

a decoder configured to decode the sub shift data and output a decoded value;

a permutation circuit configured to output a selected permutation value based on the decoded value; and a plurality of encoders configured to generate the multiplication data by encoding the selected permutation value to represent a result of the mixcolumn multiplication operation on any one of the plurality of mixcolumn multiplication values.

8. The encryption device of claim 6, wherein each of the plurality of sub security circuits comprises:

a decoder configured to decode a part of the sub shift data and output a decoded value;

a permutation circuit configured to output a selected permutation value based on the decoded value;

a plurality of encoders configured to generate the multiplication data by encoding the selected permutation value to represent a result of the mixcolumn multiplication operation on any one of the plurality of mixcolumn multiplication values; and one or more additional operation circuits configured to generate one or more pieces of multiplication data not generated by the plurality of encoders among the plurality of pieces of multiplication data, based on the multiplication data generated by the plurality of encoders.

9. An encryption device, comprising:

an encryption core circuit configured to generate output data by performing a plurality of round operations on input data; and an encryption controller circuit configured to control the encryption core circuit to sequentially perform the plurality of round operations including an initial round operation, an iterative round operation of a preset reference number of times, and a final round operation, wherein the encryption core circuit comprises a shiftrow circuit configured to generate shift data by performing a shiftrow operation on the input data, a security circuit configured to generate permutation data by performing a permutation operation including a mixcolumn multiplication operation on the shift data based on a plurality of encoding operations under control of the encryption controller circuit, a mixcolumn addition circuit configured to generate first mid data by performing a mixcolumn addition operation on the permutation data, a mixcolumn multiplication elimination circuit configured to generate second mid data by performing a mixcolumn multiplication elimination operation on the permutation data, and a round key addition operation circuit configured to generate the output data by performing a round key addition operation on the first mid data and the second mid data, wherein the iterative round operation includes the shiftrow operation, the permutation operation, the mixcolumn addition operation, and the round key addition operation, and wherein the final round operation includes the shiftrow operation, the permutation operation, the mixcolumn multiplication elimination operation, and the round key addition operation.

10. The encryption device of claim 9, wherein:

the security circuit comprises a plurality of sub security circuits configured to receive any one of a plurality of pieces of sub shift data generated by dividing the shift data, and generate any one of a plurality of pieces of multiplication data included in sub permutation data by performing the permutation operation on the sub shift data, wherein the permutation operation includes the mixcolumn multiplication operation on any one of a plurality of mixcolumn multiplication values, and the permutation data includes a plurality of pieces of the sub permutation data.

11. The encryption device of claim 10, wherein the sub shift data received by each of the plurality of sub security circuits is different from each other, or each of the plurality of sub security circuits performs the permutation operation on the mixcolumn multiplication values different from each other, wherein the permutation operation includes the mixcolumn multiplication operation.

12. The encryption device of claim 11, wherein each of the plurality of sub security circuits comprises:

a decoder configured to decode the sub shift data and output a decoded value;

a permutation circuit configured to output a selected permutation value based on the decoded value; and an encoder configured to generate the multiplication data by encoding the selected permutation value to represent a result of the mixcolumn multiplication operation on any one of the plurality of mixcolumn multiplication values.

13. The encryption device of claim 9, wherein the security circuit comprises a plurality of sub security circuits configured to receive any one of a plurality of pieces of sub shift data generated by dividing the shift data, and generate sub permutation data including a plurality of pieces of multiplication data by performing the permutation operation including the mixcolumn multiplication operation on the sub shift data, the permutation data includes a plurality of pieces of the sub permutation data, each of the plurality of pieces of multiplication data is generated by performing the permutation operation on the sub shift data, and the permutation operation includes the mixcolumn multiplication operation on any one of a plurality of mixcolumn multiplication values.

14. The encryption device of claim 13, wherein the sub shift data received by each of the plurality of sub security circuits is different from each other.

15. The encryption device of claim 14, wherein each of the plurality of sub security circuits comprises:

a decoder configured to decode the sub shift data and output a decoded value;

a permutation circuit configured to output a selected permutation value based on the decoded value; and a plurality of encoders configured to generate the multiplication data by encoding the selected permutation value to represent a result of the mixcolumn multiplication operation on any one of the plurality of mixcolumn multiplication values.

16. The encryption device of claim 14, wherein each of the plurality of sub security circuits comprises:

a decoder configured to decode a part of the sub shift data and output a decoded value;

a permutation circuit configured to output a selected permutation value based on the decoded value;

a plurality of encoders configured to generate the multiplication data by encoding the selected permutation value to represent a result of the mixcolumn multiplication operation on any one of the plurality of mixcolumn multiplication values; and one or more additional operation circuits configured to generate one or more pieces of multiplication data not generated by the plurality of encoders among the plurality of pieces of multiplication data, based on the multiplication data generated by the plurality of encoders.

17. An operating method being executed by an encryption device, the operating method comprising:

controlling, by an encryption controller circuit of the encryption device, an encryption core circuit of the encryption device to generate shift data by performing a shiftrow operation on input data;

generating, by the encryption core circuit, permutation data by performing a permutation operation including a mixcolumn multiplication operation on the shift data based on a plurality of encoding operations under control of the encryption controller circuit;

generating, by the encryption core circuit, first mid data by performing a mixcolumn addition operation on the permutation data;

generating, by the encryption core circuit, second mid data by performing a mixcolumn multiplication elimination operation on the permutation data; and generating, by the encryption core circuit, an output data by performing a round key addition operation on the first mid data and the second mid data.

18. The operating method of claim 17, wherein generating the permutation data comprises:

receiving a plurality of pieces of sub shift data generated by dividing the shift data; and generating sub permutation data including a plurality of pieces of multiplication data by performing the permutation operation on the plurality of pieces of sub shift data, wherein the permutation operation includes the mixcolumn multiplication operation on each of a plurality of mixcolumn multiplication values.

* * * * *